United States Patent
Barsness et al.

(10) Patent No.: US 8,930,345 B2
(45) Date of Patent: *Jan. 6, 2015

(54) QUERY OPTIMIZATION IN A PARALLEL COMPUTER SYSTEM TO REDUCE NETWORK TRAFFIC

(71) Applicant: International Business Machines Corporation, Armonk, NY (US)

(72) Inventors: Eric L. Barsness, Pine Island, MN (US); David L. Darrington, Rochester, MN (US); Amanda E. Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,335

(22) Filed: Mar. 5, 2013

(65) Prior Publication Data

US 2013/0191369 A1    Jul. 25, 2013

Related U.S. Application Data

(63) Continuation of application No. 11/834,813, filed on Aug. 7, 2007, now abandoned.

(51) Int. Cl.
| | | |
|---|---|---|
| *G06F 17/30* | (2006.01) | |
| *G06F 9/50* | (2006.01) | |
| *H04L 12/801* | (2013.01) | |
| *H04L 12/803* | (2013.01) | |
| *H04L 29/06* | (2006.01) | |

(52) U.S. Cl.
CPC ........ *G06F 17/30442* (2013.01); *G06F 9/5083* (2013.01); *H04L 47/10* (2013.01); *H04L 47/11* (2013.01); *H04L 47/122* (2013.01); *H04L 69/14* (2013.01)
USPC ....................................................... 707/713

(58) Field of Classification Search
USPC ....................................................... 707/713
See application file for complete search history.

(56) References Cited

U.S. PATENT DOCUMENTS

| | | | |
|---|---|---|---|
| 5,371,852 A | 12/1994 | Attanasio et al. | |
| 5,857,180 A | 1/1999 | Hallmark et al. | |

(Continued)

FOREIGN PATENT DOCUMENTS

JP    2002135330 A    5/2002

OTHER PUBLICATIONS

Eric L. Barsness et al., U.S. Appl. No. 11/834,813 "Query Optimization in a Parallel Computer System to Reduce Network Traffic", filed Aug. 7, 2007.

(Continued)

*Primary Examiner* — Amresh Singh
(74) *Attorney, Agent, or Firm* — Martin & Associates, LLC; Bret J. Petersen

(57) ABSTRACT

A database query optimizer optimizes a query that uses multiple networks. The query optimizer optimizes a query to reduce network traffic on a network or node that is overloaded or above an established parameter in a node/network attribute table. The query optimization to reduce network traffic may result in a sub-optimal query in other respects such as execution time. The result is a query optimizer that rewrites or optimizes a query to execute on multiple nodes or networks to reduce traffic on a network or node according to the loading characteristics and assigned attributes of a node or network.

19 Claims, 5 Drawing Sheets

(56) References Cited

U.S. PATENT DOCUMENTS

| | | | |
|---|---|---|---|
| 6,081,801 | A | 6/2000 | Cochrane et al. |
| 6,173,332 | B1 | 1/2001 | Hickman |
| 6,460,043 | B1 | 10/2002 | Tabbara et al. |
| 7,343,418 | B2 | 3/2008 | Herley |
| 2002/0143755 | A1 | 10/2002 | Wynblatt et al. |
| 2002/0194173 | A1 | 12/2002 | Bjornson et al. |
| 2002/0198867 | A1 | 12/2002 | Lohman et al. |
| 2003/0037048 | A1 | 2/2003 | Kabra et al. |
| 2005/0097078 | A1 | 5/2005 | Lohman et al. |
| 2005/0165748 | A1 | 7/2005 | Ting et al. |
| 2007/0053283 | A1 | 3/2007 | Bidwell et al. |
| 2008/0028379 | A1 | 1/2008 | Stichnoth |
| 2009/0089544 | A1 | 4/2009 | Liu |

OTHER PUBLICATIONS

Eric L. Barsness et al, U.S. Appl. No. 12/127,077 "Utilizing Virtual Private Networks to Provide Object Level Security on a Multi-Node Computer System", filed May 27, 2008.

Eric L. Barsness et al., U.S. Appl. No. 11/834,816 "Query Optimization in a Parallel Computer System with Multiple Networks", filed Aug. 7, 2007.

Eric L. Barsness et al., U.S. Appl. No. 11/834,823 "Query Execution and Optimization with Autonomic Error Recovery from Network Failures in a Parallel Computer System with Multiple Networks", filed Aug. 7, 2007.

Eric L. Barsness et al., U.S. Appl. No. 11/834,827 "Query Execution and Optimization Utilizing a Combining Network in a Parallel Computer System", filed Aug. 7, 2007.

Eric L. Barsness et al., U.S. Appl. No. 11/861,343 "Inserting Data Into an In-Memory Distributed Nodal Database", filed Sep. 26, 2007.

Amsaleg et al., "Scrambling Query Plans to Cope with Unexpected Delays", Parallel and Distributed Information Systems, 1996, Fourth International Conference on Miami Beach, FL, USA Dec. 18-20, 1996, Los Alamitos, CA, USA, IEEE Computer Society, US, Dec. 18, 1996, pp. 208-219.

Knoblock, Craig A., "Planning, Executing, Sensing, and Replanning for Information Gathering", 1995, http://www.isi.edu/info-agents/papers/knoblock95-ijcal.pdf.

Ives et al., "An Adaptive Query Execution System for Data Integration", SIGMOD Record, ACM, New York, NY, US, vol. 28, No. 2, Jun. 1, 1998, pp. 299-310.

Getta, Janusz R., "Query Scrambling in Distributed Multidatabase Systems", Database and Expert Systems Applications, 2000, Proceedings of the 11th International Workshop on Sep. 4-8, 2000, Piscataway, NJ, USA, IEEE, Sep. 4, 2000, pp. 647-652.

Vossough et al., "Block Level Query Scrambling Algorithm Within Distributed Multi-Database Environment", Database adn Expert Systems Applications, 2001, Proceedings of the 12th International Workshop on Sep. 3-7, 2001, Piscataway, NJ, USA, IEEE< Sep. 3, 2001, pp. 123-127.

Google, Inc. "define topology—Google Search" Feb. 23, 2010, Google.com, p. 1-2.

Network File

| Network ID | Timestamp | Util. | Future Util. | Availability | Latency | Retransmits | |
|---|---|---|---|---|---|---|---|
| NetworkA | 10:00:00 | 50% | 60% | Yes | 10ms | 1% | 410A |
| NetworkB | 10:00:00 | 10% | 10% | Yes | 30ms | 0.5% | 410B |
| NetworkC | 10:00:00 | 0% | 0% | No | 0ms | 0% | 410C |

Query Attribute File

| Query ID | Importance | Application | User ID | |
|---|---|---|---|---|
| Q1 | High | High | Med | 510A |
| Q2 | Low | Med | Med | 510B |
|  |  |  |  | 510C |

Node/Network Attribute Table
| Node/Network Identification | Importance | | | |
|---|---|---|---|---|
| NetworkA | High | | | |
| NetworkB | Med | | | |
| Node1 | High | | | |
| Node2 | Low | | | |
326
610A
610B
610C
610D
FIG. 6
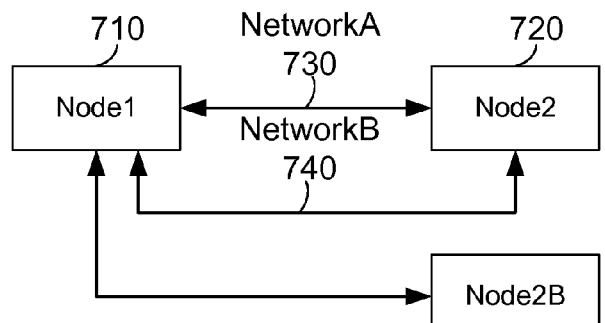
FIG. 7
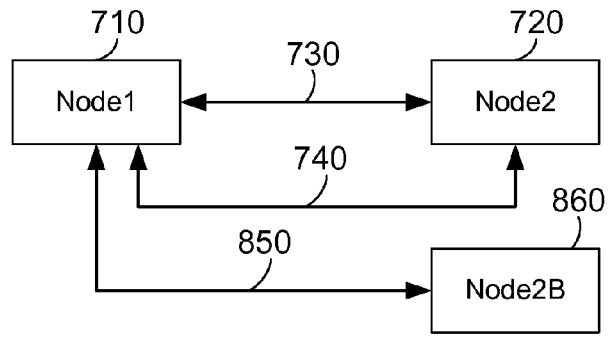
FIG. 8

QUERY OPTIMIZATION IN A PARALLEL COMPUTER SYSTEM TO REDUCE NETWORK TRAFFIC

CROSS-REFERENCE TO PARENT APPLICATION

This patent application is a continuation of U.S. Ser. No. 11/834,813 filed on Aug. 7, 2007, which is incorporated herein by reference.

BACKGROUND

1. Technical Field

This disclosure generally relates to database query optimizations, and more specifically relates to a query optimizer that rewrites a query to take advantage of multiple nodes and multiple network paths in a parallel computer system.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query.

Execution of a database query can be a resource-intensive and time-consuming process. A query optimizer is used in an effort to optimize queries to make better use of system resources. In order to prevent an excessive drain on resources, many databases are also configured with query governors. A query governor prevents the execution of large and resource-intensive queries by referencing a defined threshold. If the cost of executing a query is predicted to exceed the threshold, the query is not executed.

Many large institutional computer users are experiencing tremendous growth of their databases. One of the primary means of dealing with large databases is that of distributing the data across multiple partitions in a parallel computer system. The partitions can be logical or physical over which the data is distributed. Prior art query governors have limited features when used in parallel computer systems. The query governors do not consider network resources of multiple networks in a parallel system with a large number of interconnected nodes.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack. The Blue Gene/L supercomputer communicates over several communication networks. The compute nodes are arranged into both a logical tree network and a 3-dimensional torus network. The logical tree network connects the computational nodes so that each node communicates with a parent and one or two children. The torus network logically connects the compute nodes in a three-dimensional lattice like structure that allows each compute node to communicate with its closest 6 neighbors in a section of the computer.

Database query optimizers have been developed that evaluate queries and determine how to best execute the queries based on a number of different factors that affect query performance. However, none of the known query optimizers rewrite a query or optimize query execution for queries on multiple networks. On parallel computer systems in the prior art, the query optimizer is not able to effectively control the total use of resources across multiple nodes with one or more networks. Without a way to more effectively optimize queries, computer systems administrators will continue to have inadequate control over database queries and their use of system resources.

SUMMARY

In a networked computer system that includes multiple nodes and multiple networks interconnecting the nodes, a database query optimizer optimizes a query that uses multiple networks to satisfy the query. The query optimizer optimizes a query to reduce network traffic on a network or node that is overloaded or above an established parameter in a node/network attribute table. The query optimization to reduce network traffic may result in a sub-optimal query in other respects such as execution time. Thus, the query optimizer rewrites or optimizes a query to execute on multiple nodes or networks to reduce traffic on a network or node according to the loading characteristics and assigned attributes of a node or network.

The disclosed examples herein are directed to a massively parallel computer system with multiple networks but the claims herein apply to any computer system with one or more networks and a number of parallel nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and:

FIG. 6 is a block diagram of node/network attribute table that contains node/network information that is set by a system administrator;

FIG. 7 is a block diagram of two nodes to illustrate an example of query optimization to reduce network traffic on a node or network;

FIG. 8 is a block diagram to show query optimization to reduce network traffic on a node or network according to the example of FIG. 7;

DETAILED DESCRIPTION

1.0 Overview

Figure 1:
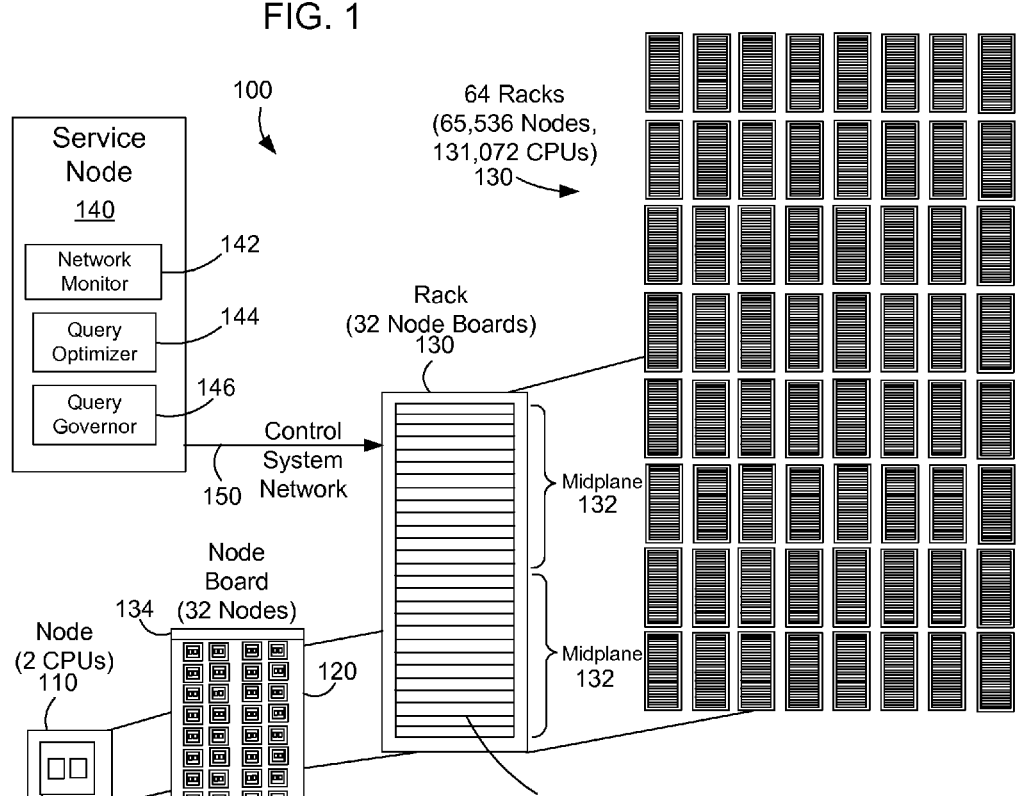
FIG. 1 is a block diagram of a computer with a query optimizer that rewrites a query to take advantage of multiple nodes and multiple network paths of a parallel computer system.

The disclosure and claims herein are related to query optimizers that develop and optimize how a query access a database. For those not familiar with databases, queries, and optimizers, this Overview section will provide additional background information.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces an access plan to execute the query in the database. The access plan may be stored in a mini-plan cache for use with subsequent queries that use the same access plan. In the prior art, a tool known as a query optimizer evaluates expressions in a query and optimizes the query and generates the access plan to access the database.

2.0 Detailed Description

The BlueGene supercomputer family developed by IBM includes thousands of compute nodes coupled together via multiple different networks. In the BlueGene architecture, the torus and logical tree networks are independent networks, which means they do not share network resources such as links or packet injection FIFOs. When nodes are interconnected with different independent networks, as in the case of the BlueGene architecture, the use of one or more networks can affect the performance of database queries that include resources on one or more nodes and networks. A query optimizer can now take advantage of multiple networks when executing a database query. Known query optimizers take many things into consideration when optimizing a database query, but no known query optimizer has optimized queries by rewriting or optimizing the query to execute on multiple networks to optimize performance of a network.

The detailed description is given with respect to the Blue Gene/L massively parallel computer being developed by International Business Machines Corporation (IBM). However, those skilled in the art will appreciate that the mechanisms and apparatus of the disclosure and claims apply equally to any parallel computer system with multiple nodes and networks.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit Ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a node/network manager 142. The node/network manager 142 comprises software in the service node and may include software in the nodes. The service node 140 further includes a query optimizer 144, and a query governor 146. The query optimizer 144 and the query governor 146 may execute on the service node and/or be loaded into the nodes. The node/network manager 142, the query optimizer 144 and the query governor are described more fully below.

Figure 2:
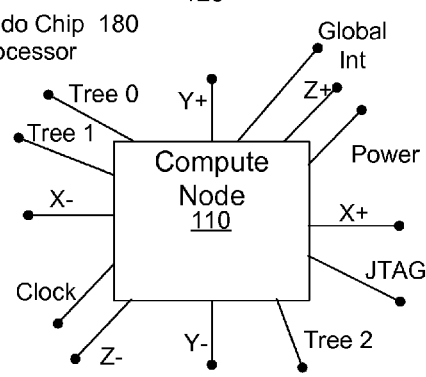
FIG. 2 is a block diagram of a compute node to illustrate the network connections to the compute node.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figures 3, 4, 5:
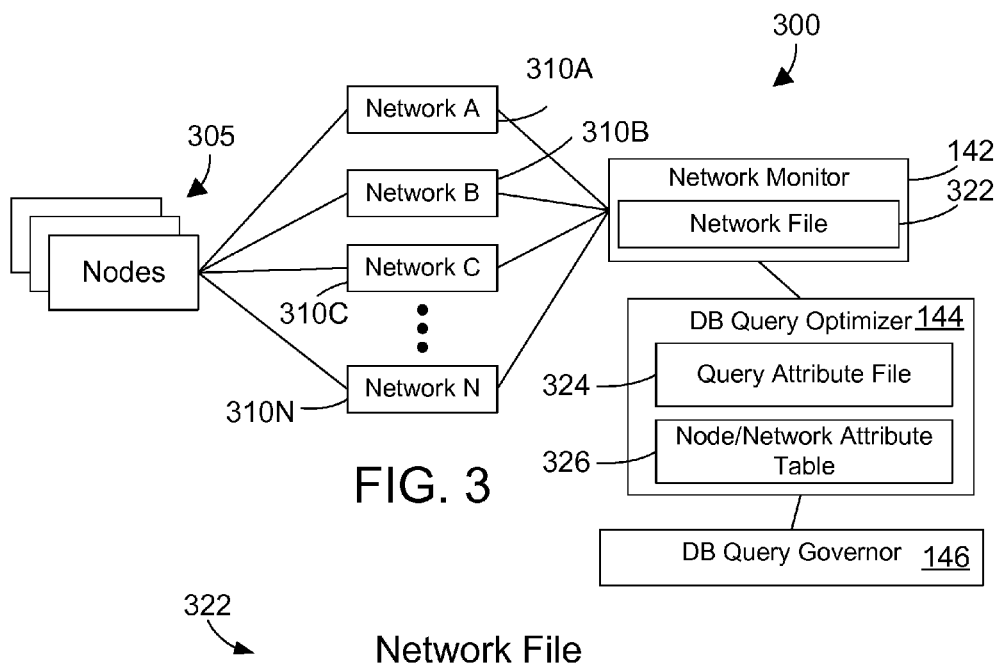
FIG. 3 is a block diagram representing a query optimizer system.
FIG. 4 is a block diagram of a network file record that contains information about network utilization.
FIG. 5 is a block diagram of a query attribute file records that contains information about queries set by an administrator.

Referring to FIG. 3, a system 300 is shown to include multiple nodes 305 coupled together via multiple networks 310A, 310B, 310C, ..., 310N. The system 300 represents a portion of the computer system 100 shown in FIG. 1. The multiple networks are also coupled to a network monitor 142 that monitors the networks and logs the network characteristics in a network file 322. The network monitor 142 provides input data to the query optimizer (or optimizer) 144. The query optimizer 144 includes a query attribute file 324 that holds attribute information that can be used by the query optimizer to make priority determinations. The query optimizer also includes a node/network attribute table 326 that is used to determine how to determine if a node/network is over loaded and can be re-optimized to execute over a different network. These information structures, the network file 322, the query attribute file 324 and the node/network attribute table 326 are described more fully below. In the preferred implementation, the multiple networks are independent networks so a problem with one network does not affect the function of a different network. However, networks that are not independent may also be used.

Again referring to FIG. 3, the query optimizer 144 works in conjunction with the query governor 146. When an overloaded network or node cannot be re-optimized, then the execution of the query can be referred to the query governor to make a determination whether to execute the query. The query governor may determine that the priority of the query is low and not execute the query, or may determine the priority of the query is high and therefore execute the query despite the overloaded network. The optional feature of using the query governor to determine execution of the query is illustrated in the method flow diagram in FIG. 9.

FIGS. 4, 5 and 6 illustrate information structures that store information that can be used by the query optimizer to determine how to optimize queries over multiple nodes and networks in a parallel computer database system. FIG. 4 illustrates a network file 322 that is used by the query optimizer and the query governor. The network file 322 is maintained by the network monitor 142 (FIGS. 1,3). Network file 322 preferably includes multiple records as needed to record status information about the networks in the computer system. The illustrated network file 322 has records 410A, 410B, and 410C. The network file records 410A through 410C contain information such as the network identifier (ID), a time stamp, current utilization, future utilization, network availability latency and the percentage of retransmits. The current utilization represents how busy the network is in terms of bandwidth utilization at the time of the timestamp. Where possible, the future utilization of the network is predicted and stored. Similar to the node availability described above, the availability of the network indicates whether the network is available or not. Data stored in the network file 322 includes historical and real time information about the network status and loading.

FIG. 5 illustrates a query attribute file 324 that is used by the query optimizer. The query attribute file 324 is preferably setup by a system administrator. The query optimizer 144 (FIG. 1) or other software in the service node 140 may include a graphical user interface (GUI) to allow a system administrator to setup query attributes in the query attribute file 324. The query attribute file 324 contains multiple records, with a record for each query that is assigned an attribute. In the illustrated example, the query attribute file 324 has records 510A and 510B. The records 510A and 510B have status information about the queries and software in the computer database system. The records in the query attribute file 324 contain information such as the query id, the importance of the query, an application priority, and a user ID priority. The query optimizer checks the query attribute file 324 to determine whether a query can execute on a given network as described further below.

FIG. 6 illustrates a node/network attribute table 326 that is used by the query optimizer. The node/network attribute table 326 is preferably setup by a system administrator using a graphical user interface (GUI) as described further above. The node/network attribute table 326 contains multiple records that have status information about the nodes and networks in the computer system. In the illustrated example, the records 610A through 610D in the attribute table 326 contain information such as the node/network id and the importance of the node/network resource. The query optimizer checks the node/network attribute table to determine whether a query can execute on a given network as described further below.

FIG. 7 shows a block diagram of two nodes to illustrate an example of query optimization to reduce network traffic on a node or network. A first node, Node1 710, is connected to Node2 720 over a networkA 730 and a networkB. Node1 710, Node2 720, networkA 730 and networkB 740 represent nodes and networks in a parallel computer system such as the Blue Gene computer system shown in FIG. 1. We assume for this example that a query on Node1 710 needs to access data on Node2 720. The query is first optimized in the normal manner. The optimized query is determined to involve multiple networks or have multiple networks available 730 and 740. The query optimizer uses the data in the network file 322 to examine each network to determine if the network is overloaded. In this example, networkA 730 and networkB 740 correspond to network ID's A and B respectively in the network file 322 shown in FIG. 4. The query optimizer checks the data in the network file 322 for each network. In this example, networkA 730 is found to be overloaded due to the high utilization numbers and the number of retransmits. The query optimizer determines that the query will use too much network bandwidth on the heavily loaded network 730 and potentially overload the network 730. The query optimizer may make this determination based on the various data in the network file and the node/network attribute file. The determination of an overloaded network may vary depending on the importance of the network in the node/network attribute file 326, thus a lower importance of the network requires higher utilization, higher latency and/or higher percentage of retransmits to be considered overloaded.

Again referring to FIG. 7, since the network 730 is potentially overloaded, the query optimizer will attempt to rewrite the query or re-optimize the query to decrease the network traffic by using a different network that also communicates from Node1 to Node2. In the Blue Gene system, this different network may be an alternate path of using the torus network to get to Node2, or it may be an entirely different network. The query optimizer may pursue the re-optimization even when it is determined that the optimized query would be sub-optimal in other ways, such as slowing down other queries by using more system resources or slowing down other nodes/networks that are deemed less important as determined by the node/network attribute table 326 (FIGS. 3, 6). In this example, the query optimizer determines the query can be re-optimized because there is an additional network (networkB 740) that is not overloaded as indicated by the data in the network file 322. Thus, the query optimizer can re-optimized the query to use networkB 740. If the query could not be re-optimized, the query governor would be consulted on whether to halt the query. The query governor may halt the query where the query is low importance such as query Q2 shown in FIG. 5.

FIG. 8 shows again a block diagram of two nodes to further illustrate the example of query optimization introduced in FIG. 7. Node1 710 is connected to Node2 720 over the network 730, which was determined to be overloaded as discussed above. The query optimizer will then attempt to rewrite the query or re-optimize the query to decrease the network traffic on network 730 as discussed above. Alternatively, the query optimizer can re-optimize the query to decrease the network traffic by optimizing or rewriting the query to use another network 850 that communicates with a copy of Node2 illustrated as Node2B 860. The alternate or copy node, Node2B may be readily available since there are often many similar nodes in the parallel computer system. Alternatively, the query optimizer could request that the service node provide a copy node when an existing copy is not available.

Figure 9:
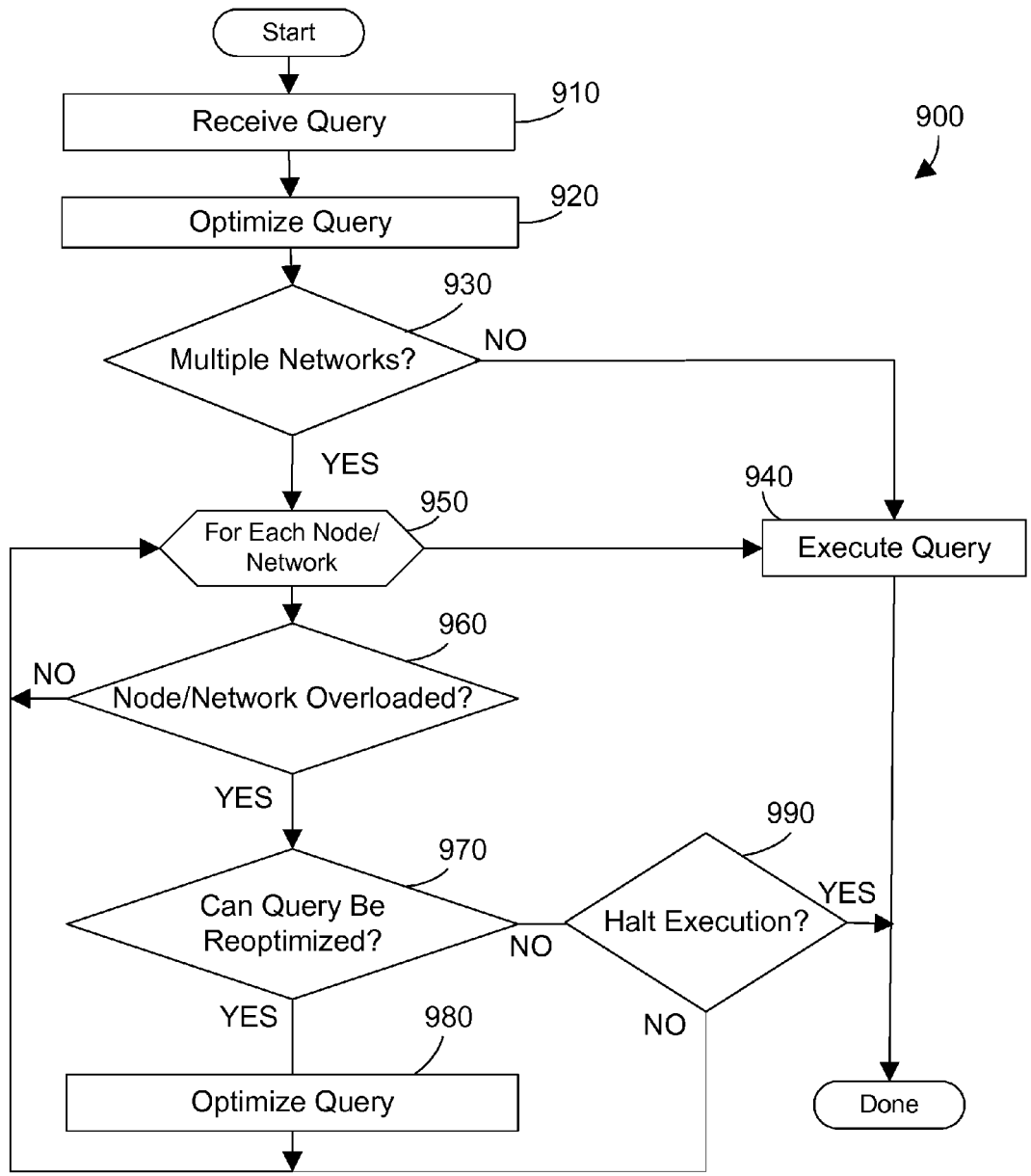
FIG. 9 is a method flow diagram for a query optimizer in a parallel database system.

FIG. 9 shows a method 900 for optimizing a computer database query with multiple nodes and/or networks. The method 900 first receives an query (step 910) and optimizes the query (step 920). If there are not multiple networks involved in the query (step 930=no) then execute the query (step 940), and the method is done. If there are multiple networks available to complete the query (step 930=yes), then analyze the query for each node/network in the query (step 950). If a node/network is not overloaded (step 960=no) then analyze the next node/network until all the networks are complete. When all the networks are complete (step 950), then execute the query (step 940) and the method is then done. If a node/network is overloaded (step 960=yes), then determine if the query can be re-optimized using a different node/network for the node/network that is overloaded (step 970). If the node can be re-optimized (step 970=yes) then optimize the query (step 980) and go to the next node/network (step 950). If the node cannot be re-optimized (step 970=no) then the query governor is consulted to determine whether to halt execution or to allow execution (step 990). If the query governor determines to halt execution (step 990=yes) then the query is not executed and the method is then done. If the query governor determines not to halt execution for this overloaded network (step 990=no) then check the next network (step 950) until all the networks are checked.

Figure 10:
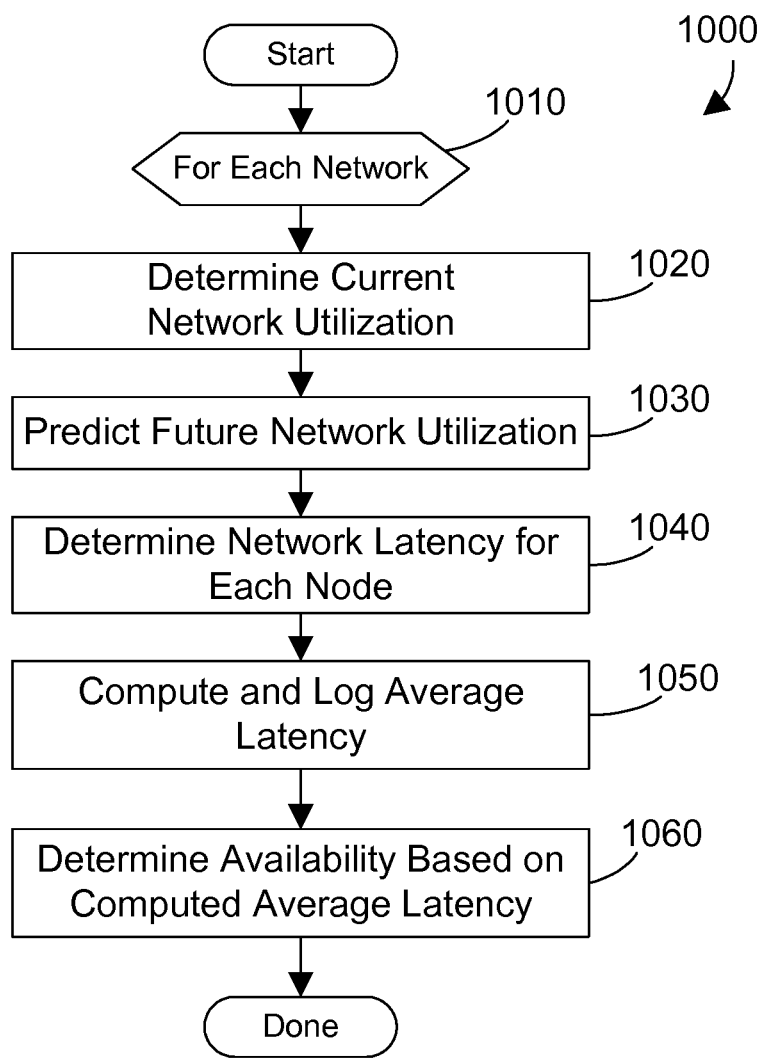
FIG. 10 is a method flow diagram to create network file records that are used by the query optimizer.

FIG. 10 shows a method 1000 for the network monitor 142 in FIGS. 1 and 3 to determine network traffic and network characteristics. The method may be executed on the compute nodes or on the service node 140 shown in FIG. 1. This method is executed for each network to govern database query activity in the database. For each network (step 1010), determine the current network utilization (step 1020). If possible, future network utilization is predicted (step 1030). Future network utilization could be predicted based on previous statistics stored in the network file. Predicted future network utilization could also be based on history if the application has been run before or has an identifiable pattern, and could be based on information provided about the application. For example, certain types of applications traditionally execute specific types of queries. Thus, financial applications might execute queries to specific nodes while scientific applications execute queries to all of the nodes. The latency for each node is determined (step 1040). The average latency is computed and logged (step 1050). The availability of the network may then be determined based on the computed average latency (step 1060). For example, if the computed average latency exceeds some specified threshold level, the network would not be overloaded or not available, but if the computed average latency is less than or equal to the specified threshold level, the network would be available. Note that the determination of whether or not a network is 'available' by the network monitor in step 1060 in FIG. 10 relates to whether the network is overloaded in step 960 in FIG. 9, and may be determined using any suitable heuristic or criteria.

Method 1000 in FIG. 10 may be performed at set time intervals so the network characteristics are constantly updated regardless of when they are used. Of course, in the alternative method 1000 could be performed on-demand when the network characteristics are needed. The benefit of doing method 1000 on-demand when the network characteristics are needed is the data will be as fresh as it can be. The downside of doing method 1000 on-demand when the network characteristics are needed is the delay that will be introduced by the network monitor 142 determining the network characteristics. Having the network monitor periodically gather the network characteristics means these characteristics are readily available anytime the query optimizer needs them. The period of the interval may be adjusted as needed to balance the performance of the system with concerns of the data being too stale.

The detailed description introduces a method and apparatus for a query optimizer to optimize queries to multiple networks in a parallel computer system. A query optimizer optimizes a query to reduce network traffic on a network or node that is overloaded or above an established parameter in a node/network attribute table. The query optimizer allows a database query to better utilize system resources of a multiple network parallel computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer apparatus comprising:
a plurality of nodes each having a memory and at least one processor;
a database residing in the memory;
a plurality of networks connecting the plurality of nodes;
a query residing in the memory;

a query optimizer residing in the memory and executed by the at least one processor, wherein the query optimizer optimizes the query to reduce network traffic over an overloaded network of the plurality of networks;

an attribute table with attributes associated with the plurality of nodes and the plurality of networks, where the attributes are used by the query optimizer to determine whether to use multiple networks to optimize the query; and a query attribute file that holds attribute information for the query that can be used by the query optimizer to make priority determinations.

2. The computer apparatus of claim 1 wherein the optimized query that reduces network traffic is sub-optimal in performance.

3. The computer apparatus of claim 1 wherein the optimized query uses a copy node and a different network.

4. The computer apparatus of claim 1 wherein the attributes in the attribute table comprise an identification (ID), and an importance.

5. The computer apparatus of claim 1 further comprising a service node connected to the plurality of nodes that controls the plurality of nodes, and a network monitor that periodically monitors the plurality of networks to determine network loading.

6. The computer apparatus of claim 1 further comprising a query governor that is employed depending on network loading to determine whether and how to execute the query where the query cannot be re-optimized to avoid an overloaded network.

7. The computer apparatus of claim 1 further comprising a network file that is used by the query optimizer and wherein the network file contains network file information selected from the following: network ID, a timestamp, current utilization, future utilization, availability, latency and retransmits.

8. The computer apparatus of claim 1 further comprising a query governor that is employed depending on network loading to determine whether and how to execute the query where the query cannot be re-optimized to avoid an overloaded network.

9. The computer apparatus of claim 1 further comprising a network file that is used by the query optimizer and wherein the network file contains network file information selected from the following: network ID, a timestamp, current utilization, future utilization, availability, latency and retransmits.

10. An article of manufacture comprising software residing on non-transitory computer readable media, the software running on a parallel computer system with a plurality of compute nodes and a plurality of networks, the software comprising:

a query optimizer that performs the steps of:
receiving a query to a database;
optimizing the query;
determining the query utilizes multiple networks;
determining whether any of the multiple networks are overloaded;
re-optimizing the query to reduce traffic on an overloaded network using an attribute table with attributes associated with the plurality of nodes and the plurality of networks to determine whether to use multiple networks to optimize the query, and using a query attribute file that holds attribute information for the query to make priority determinations when to re-optimize the query to reduce traffic on an overloaded network; and executing the re-optimized query.

11. The article of manufacture of claim 10 wherein the re-optimized query that reduces network traffic is sub-optimal in performance.

12. The article of manufacture of claim 10 wherein the re-optimized query uses a substitute node and a different network.

13. The article of manufacture of claim 10 wherein the attributes in the attributes table are setup by a system administrator and used by the query optimizer to determine whether to use multiple networks to optimize the query.

14. The article of manufacture of claim 10 wherein the attributes in the attributes table comprise an identification (ID), and an importance.

15. The article of manufacture of claim 10 further comprising a service node connected to the plurality of nodes that controls the plurality of nodes, and a network monitor that periodically monitors the plurality of networks to determine network loading.

16. The article of manufacture of claim 10 further comprising a query governor that is employed depending on the network loading to determine how to execute the query where the query cannot be re-optimized to avoid an overloaded network.

17. A computer apparatus comprising:
a plurality of nodes each having a memory and at least one processor;
a database residing in the memory;
a plurality of networks connecting the plurality of nodes;
a query residing in the memory;
a query optimizer residing in the memory and executed by the at least one processor, wherein the query optimizer optimizes the query to reduce network traffic over an overloaded network of the plurality of networks and wherein the optimized query that reduces network traffic is sub-optimal in performance;
an attribute table with attributes associated with the plurality of nodes and the plurality of networks, where the attributes are used by the query optimizer to determine whether to use multiple networks to optimize the query, wherein the attributes in the attribute table comprise an identification (ID), and an importance; and
a query attribute file that holds attribute information for the query that can be used by the query optimizer to make priority determinations.

18. The computer apparatus of claim 17 wherein the optimized query uses a copy node and a different network.

19. The computer apparatus of claim 17 further comprising a service node connected to the plurality of nodes that controls the plurality of nodes, and a network monitor that periodically monitors the plurality of networks to determine network loading.

* * * * *